May 7, 1935.    C. C. FUERST    2,000,588
CAMERA CONSTRUCTION
Filed Aug. 11, 1934    2 Sheets-Sheet 1
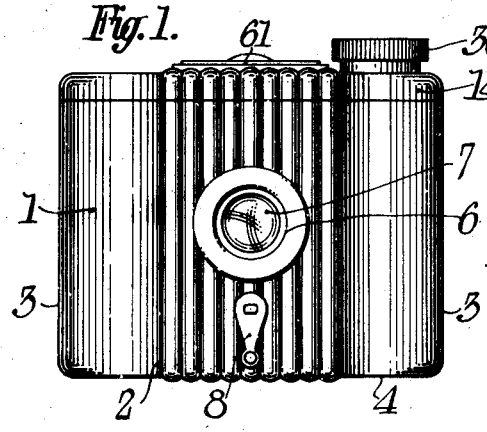
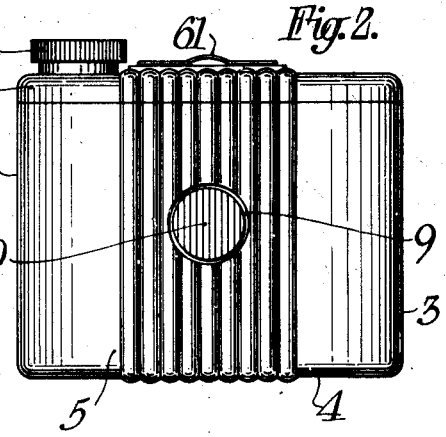
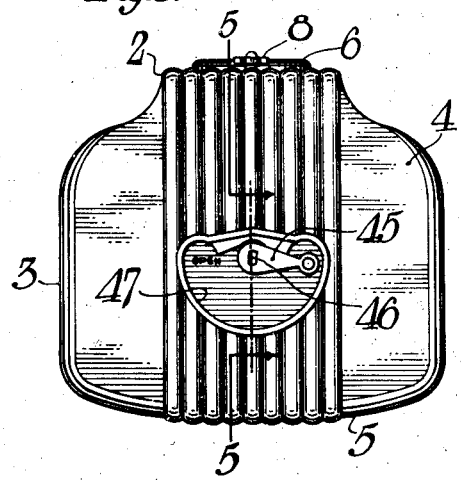
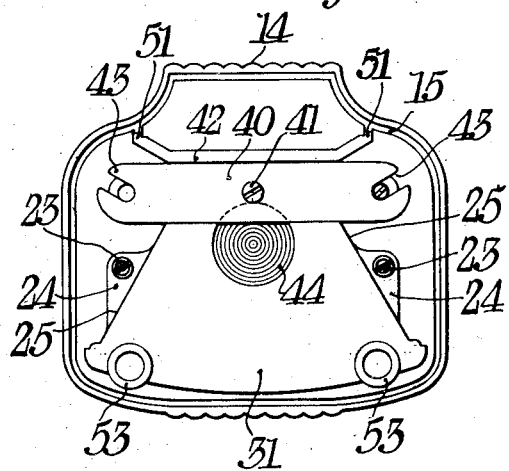
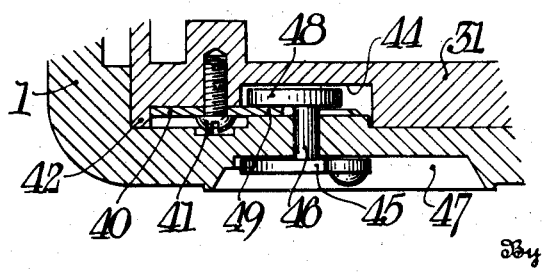
Inventor:
Carl C. Fuerst,
By Newton N. Perrins
Donald H. Stewart
Attorneys May 7, 1935. C. C. FUERST 2,000,588
CAMERA CONSTRUCTION
Filed Aug. 11, 1934 2 Sheets-Sheet 2

Inventor:
Carl C. Fuerst,
By Newton M. Perrins
Donald H. Stewart
Attorneys

Patented May 7, 1935

2,000,588

UNITED STATES PATENT OFFICE 2,000,588

CAMERA CONSTRUCTION

Carl C. Fuerst, Rochester, N. Y., assignor to Eastman Kodak Company, Rochester, N. Y., a corporation of New York Application August 11, 1934, Serial No. 739,457

9 Claims. (Cl. 95—31)

This invention relates to photography and more particularly to photographic cameras.

One object of my invention is to provide a camera which can be readily made of molded or die-cast materials. Another object of my invention is to provide a camera which consists of relatively few simple parts which can be readily assembled. Another object of my invention is to provide a camera in which the roll holder is removable for loading the camera and to provide a novel and simple means for sliding the roll holder into the camera body. Another object of my invention is to provide a camera with a track or guideway upon which the roll holder may slide to and from an operative or picture-taking position. Another object of my invention is to provide a camera with a means for directing a film into the proper channel as the camera roll holder is moved into the camera body. Still another object of my invention is to provide a camera including a curved exposure frame and a series of parallel ribs for holding the film at intervals toward the exposure frame, and other objects will appear from the following specification, the novel features being particularly pointed out in the claims at the end thereof.

Coming now to the drawings wherein like reference characters denote like parts throughout:

Fig. 1 is a front elevation of a camera constructed in accordance with and embodying a preferred form of my invention;

Fig. 2 is a rear elevation of the camera shown in Fig. 1;

Fig. 3 is a bottom plan view of the camera shown in the preceding figures;

Fig. 4 is a bottom plan view of the roll holder removed from the camera body;

Fig. 5 is an enlarged fragmentary detail in part section showing the latching mechanism for holding the roll holder in the camera body;

Figure 6:
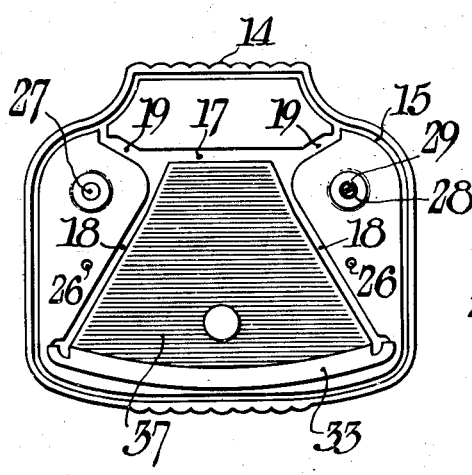
Fig. 6 is a bottom plan view of the top of the camera before the roll holding carrier is assembled to it.

In making cameras of molded materials, it is particularly desirable to form the parts of comparatively simple shapes which can be readily assembled together. It is also derisable to eliminate sharp corners and to form the various parts of such shape that they can be readily withdrawn from the molds.

In Fig. 1 I have shown a camera constructed in accordance with my invention which comprises a camera body portion 1 which, as shown in the first three figures, may comprise a front wall 2, side walls 3, a bottom wall 4, and a curved rear wall 5.

The front wall 2 is provided with a flanged opening 6 for receiving a simple type of camera objective 7. A trigger 8 on the front wall of the camera is for actuating the shutter. The structure of the shutter is not shown in this application, but can be found in my co-pending application for camera shutters, Serial No. 735,732, filed July 18, 1934.

The rear wall 5 of the camera may be provided with the usual opening 9 in which there is a red window 10 for viewing the numbers on the film backing paper in the usual manner.

Figure 8:
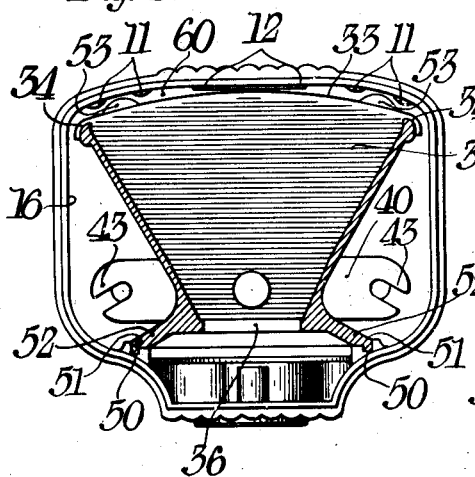
Fig. 8 is a section taken through the roll holder while in position in a camera body which is shown in elevation.
Figure 9:
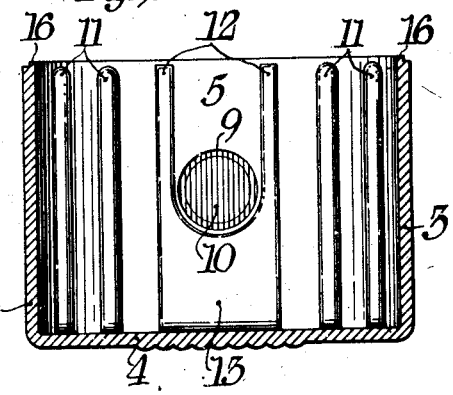
Fig. 9 is a section on line 9—9 through the camera body showing the curved rear wall of the camera.

The rear curved wall 5 of the camera body 1, as shown in Fig. 9, is provided with a series of formed-up ribs 11 which, as shown in Fig. 8, can conveniently be made of rounded cross-section. There are also ribs 12 formed in the back of the camera, these ribs lying on each side of the red window 10 and being connected into a solid pad 13 beneath the red window. The ribs 11 and 12 all have rounded edges so as to present a smooth surface to contact with the film backing paper when the roll holder is introduced into the camera, as will be more fully described hereinafter.

The camera roll holder, as shown in Fig. 4, may include the top wall 14 of the camera which is provided with a groove 15 extending entirely around the top. This groove is adapted to receive a corresponding flange 16 (see Fig. 8) which extends entirely around the top of the camera body. The groove 15 and the flange 16 form interlocking members which effectually prevent light from leaking in between the camera top 14 and the camera body 1.

Referring to Fig. 6, the top 14 of the camera which forms a part of the roll holder, in addition to the groove 15 extending entirely around the edge of the top, is provided with grooves 17, 18, and 19, all of these grooves joining each other.

Figure 7:
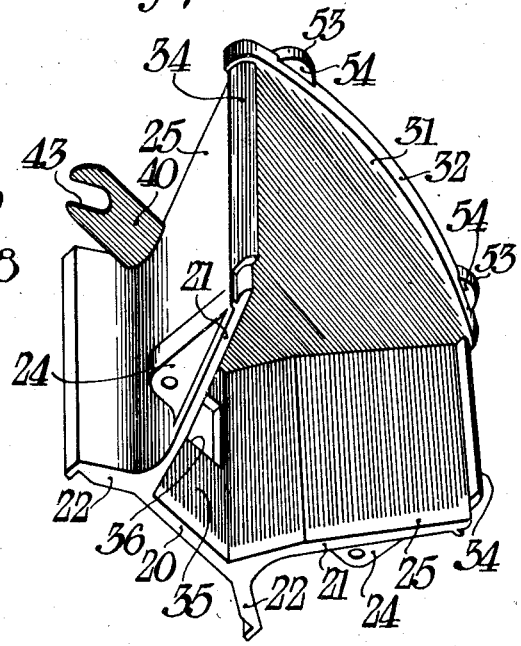
Fig. 7 is a perspective view of the spool holding mechanism and a part of the exposure frame which may be assembled to the camera top to form the complete roll holder.

The reason for the grooves 17, 18, and 19 is that they are to receive the flanges 20, 21, and 22 which form a part of the spool carrier shown in perspective in Fig. 7. The spool carrier is assembled to the camera top by bringing the flanges and grooves above-mentioned into contact and by fastening these parts together by means of screws 23, as shown in Fig. 4. These screws pass through lugs 24 on the side walls 25 and into apertures 26 in the top, these apertures being tapped.

The camera top 14 is provided with a pair of spool bearings 27 and 28, the latter being equipped with a winding key 29 which passes through the camera top and is attached to the winding key handle 30 on the top of the camera.

The side walls 25 are connected across that end which lies opposite the flanges 20 and 21 by means of an end wall 31, this end wall having a curved rounded surface 32 which serves as one film guideway and which is of the same size and curvature as the curved wall 33 which projects downwardly from the camera top 14. Members 32 and 33 form the two longitudinal edges of the exposure frame, the end edges of which are formed by the walls 34.

There is a front wall 35 on the roll holder which is provided with a window 36 through which exposures may be made from the objective to the film.

Figure 10:
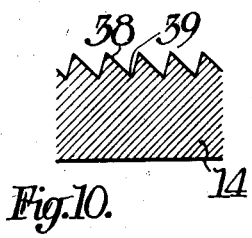
Fig. 10 is a fragmentary detail showing the method of roughening the interior camera walls to prevent reflection.

It will be noted that all of the inside walls of the roll holder, namely the inside of walls 25, 31, and 35 and wall 37 of the camera top are shown as being roughened or corrugated. A detail of these corrugations is shown in Fig. 10 wherein a section through the surface of these walls shows a plurality of ridges 38 separated by depressions 39, the design of these being such that stray light passing through the objective and striking these walls will be absorbed and will not be reflected to the film lying over the exposure frame.

On wall 31 of the roll holder the spool holding mechanism consists of a spring arm 40 preferably attached by a screw 41 to the wall 31 and lying against a flange 42 which positions the spring arm 40. The ends of this arm are provided with slots 43 which are for receiving spool trunnions of a spool well known, as the "Vest-pocket film spool." There is a circular depression 44 on the roll holder and, as best shown in Fig. 5, this permits the camera latch to operate.

The camera latch consists of a handle 45 mounted on a shaft 46 so that the handle may swing through the depressed area 47 formed in the bottom of the camera, as shown in Fig. 3. When the lever 45 is swung to the position shown in Fig. 3, the locking cam 48 on the end of shaft 46 swings over a portion 49 of the spring arm 40 so as to hold the camera roll holder securely to the camera. When, however, the lever 45 is swung to an opposite position toward the word "open" in Fig. 3, the locking cam 48 swings in the opening 44 from beneath the arm 40 so that the roll holder may be removed from the camera.

In order to guide the roll holder into the camera, the camera body 1 and the roll holder which forms a part of the camera top 14 are provided with guideways comprising grooves 50 on the camera which are adapted to receive tongues 51 formed on the ends of arms 52 of the roll holding structure, as shown in Fig. 8. In other words, these cooperating parts form a slidway on which one edge of the roll holder may slide. However, the other edge of the roll holder must also be guided to keep the tongues and grooves in position. Accordingly, the roll holder is provided with a pair of rearwardly extended rounded lugs 53 which perform two functions: first, by sliding between the pairs of parallel film guiding ribs 11, these lugs tend to hold the cooperating tongues 51 and grooves 50 in contact, and second, the upper surface 54 of the lugs 53 form guides for one edge of the film or film backing paper when the roll holder is removed from the camera body for loading the film by inserting the film spools in the spool holders 27 and 28 in the camera top and beneath the spring arm 40 with the spool trunnions engaged in the slots 43. The opposite edge of the film will be guided by the curved wall 33 on the camera top and the top wall itself. Thus a film can be accurately positioned in the roll holder before this member is placed in the camera body.

It should also be noted from Fig. 8 that there is quite a space indicated by the numeral 60 between the exposure frame 32, 33, and 34 and that the film passed over this exposure frame might tend to spring away from the frame. To prevent this, the film is properly guided into position as the roll holder slides into the camera by means of the smoothly formed ribs 11 and 12. After the roll holder has once been fastened in the camera by means of the handle 45, the film can be drawn over the curved plane accurately by turning the winding key 30. The supply spool is under tension, since it lies between the fixed wall 14 of the top engaged in the trunnion receiving openings 27 and 28 and the spring arm 40, this arm exerting a downward tension upon the spool to prevent its accidental turning. Thus when the winding key 30 is turned, the film will be drawn smoothly over its curved exposure frame.

It is well known that simple forms of objectives do not have flat fields. The curve of the exposure frame of this camera is preferably made so that it approximates the field of the simple objective used in the camera. However, since a relatively small diaphragm stop is used with such lenses, the covering power is sufficient to form a satisfactory image over the area of the exposure frame.

On the top 14 of the camera, I prefer to provide a finder 61 of the direct view type, but since this forms no part of the present invention, it need not be described here further except to say that this finder folds down into an opening in the top wall, similar, except for shape, to the opening 47 in which the latching lever moves in the bottom wall of the camera.

The operation of this camera is extremely simple. In order to load the camera, the lever 45 is swung to its open position. Pulling out on the top 14 of the camera will cause the roll holder to slide out with the cooperating tongues and grooves acting as a slideway. Supply and take-up film spools are positioned beneath the spring arm 40 with the spool trunnions engaging the bearings 27 and 28 on the camera top and the slots 43 and the spring arm 40. The film backing paper is then threaded across the exposure frame formed by the following elements— 32, 33, and 34, the film lying on the tops of the curved rails 32 and 33 and contacting with or lying beneath the walls 54 of the lugs 33 and the top wall of the camera. The tongues 51 are then inserted in the grooves 50, and as the lugs 53 slide down between the parallel film engaging ribs 11, the roll holder is guided in its downward movement into the camera. The ribs 11 direct the film backing paper properly into place, and when the groove 15 in the cover engages the flange 16 of the camera body 1, the roll holder is definitely positioned in the camera with the recess 44 lying over the locking cam 48. By turning the handle 45 to the position shown in Fig. 3, the roll holder is locked in the camera and is in a picture-taking position. Exposures can then be made by operating the trigger 8 in the manner described in my co-pending application.

Having thus described my invention, what I claim as new and desire to secure by Letters Patent of the United States is:

1. In a camera, the combination with a body portion, of a roll holder adapted to slide into and out of the body portion for loading the camera, a rear wall on the body, an exposure frame carried by the roll holder, and a plurality of parallel film guiding ribs carried by the camera back and extending transversely of the exposure frame adapted to hold spaced areas of a film toward the exposure frame.

2. In a camera, the combination with a body portion, of a roll holder, cooperating tongues and grooves on the body and roll holder on which the latter may slide to and from the camera body for loading the camera, a rear wall on the body, an exposure frame carried by the roll holder, and a plurality of parallel film guiding ribs carried by the camera back and extending parallel to the cooperating tongues and grooves and adapted to engage and position spaced portions of a film as the roll holder is slid into position in the camera body.

3. In a camera, the combination with a body, of a roll holder, cooperating means on the roll holder and body for sliding the former relatively to the latter to and from an operative picture-taking position, a curved wall on the body, a plurality of ribs carried by the curved wall and extending parallel to the axis of the curved wall, a curved exposure frame carried by the roll holder, said ribs being spaced from the exposure frame a distance sufficient to permit the roll holder and body to move relatively to each other and to confine a film carried by the roll holder to a predetermined area between the ribs and exposure frame.

4. In a camera, the combination with a body, of a roll holder, cooperating means on the roll holder and body for sliding the former relatively to the latter to and from an operative picture-taking position, a curved wall on the body, a plurality of ribs carried by the curved wall and extending parallel to the axis of the curved wall, a curved exposure frame carried by the roll holder, said ribs including smooth film engaging surfaces projecting from the curved rear camera wall a distance to prevent a film from contacting with said camera wall and to facilitate moving the roll holder loaded with film into the camera body toward an operative position.

5. In a camera adapted to be made of a moldable composition, the combination with a body portion including side, front, back, and bottom walls, of a roll holder including a grooved top wall, roll supports, and an exposure frame fitting into the grooved top wall, and a cooperating tongue and groove carried by the camera body and roll holder on which one can slide relative to the other for loading the camera.

6. In a camera adapted to be made of a moldable composition, the combination with a body portion including side, front, back, and bottom walls, of a roll holder including a grooved top wall, roll supports and an exposure frame fitting into the grooved top wall, means for fastening the roll supports and exposure frame in the grooved top wall, cooperating tongues and grooves carried by the camera body and roll holder in which the parts may move for loading the camera, and a plurality of film guides carried by the camera body and extending parallel to the tongues and grooves.

7. In a camera, the combination with a camera body including side, front, back, and bottom walls, of a roll holder including a top wall, spool holders and exposure frame, means mounted on the front of the body for guiding one part relatively to the other for removing the body from the roll holder for loading, and means mounted on the back of the roll holder tending to keep the front guiding means in contact.

8. In a camera, the combination with a camera body including side, front, back, and bottom walls, of a roll holder including a top wall, spool holders and exposure frame, means mounted on the front of the body and including grooves for guiding the roll holder, tongues on the roll holder adapted to engage said flanges, and lugs carried by the back of the roll holder adapted to lie adjacent the rear wall of the camera body whereby the tongues and grooves may be retained in contact when said roll holder is inserted in said camera.

9. In a camera, the combination with a camera body including side, front, back, and bottom walls, of a roll holder including a top wall, spool holders and exposure frame, means mounted on the front of the body for guiding one part relatively to the other for removing the body from the roll holder for loading, and means including spaced ribs mounted on the back wall of the camera and lugs mounted on the roll holder adapted to cooperate with the first-mentioned guiding means for positioning the roll holder relative to the body in sliding the parts into contact.

CARL C. FUERST.